United States Patent [19]

Rayno

[11] 4,170,812
[45] Oct. 16, 1979

[54] METHOD OF MAKING A DUAL VALUE CAPACITOR

[75] Inventor: Glenn D. Rayno, Fairfield, Conn.

[73] Assignee: Advance Transformer Co., Chicago, Ill.

[21] Appl. No.: 833,025

[22] Filed: Sep. 14, 1977

[51] Int. Cl.$^2$ .................. H01G 4/32; H01G 4/38
[52] U.S. Cl. .................... 29/25.42; 242/56.1; 361/307; 361/310; 361/330
[58] Field of Search ............ 29/25.42; 242/56.1; 361/328, 329, 330, 307, 310

[56] References Cited

U.S. PATENT DOCUMENTS

| | | | |
|---|---|---|---|
| 1,658,501 | 2/1928 | Valle | 361/328 |
| 3,522,496 | 8/1970 | Grahame | 361/330 |
| 4,028,595 | 6/1977 | Stockman | 361/328 |

FOREIGN PATENT DOCUMENTS 30660 10/1959 Finland .................. 361/307

*Primary Examiner*—Carl E. Hall
*Attorney, Agent, or Firm*—Silverman, Cass & Singer, Ltd.

[57] ABSTRACT

An auxiliary capacitor is added to a first capacitor formed from two metallized films wound into a cylindrical roll. Once the two metallized films have been wound a sufficient number of layers to form a capacitor having the desired capacitance, the auxiliary capacitor is added by one of two methods. In the first method, one of the metallized films is cut and a plain film is inserted between the roll and the uncut metallized film. After the plain film has been inserted and wound a portion of a turn, a metal foil is inserted between the plain film and the dielectric side of the uncut metallized film. The two films and foil then are wound together a sufficient number of layers to form the desired capacitance of the auxiliary capacitor.

An electrical contact foil may be added between the plain film and the metal foil or the metal foil may be left slightly exposed for electrical contact to be made to it.

In the second method both metallized films are first terminated. The core then may be sealed and heat treated. A plain film is first wound around the core, then a third metallized film is inserted between the roll and the plain film and wound a portion of a turn. Then, the metal foil is inserted between the dielectric side of the third metallized film and the roll and wound for the desired number of turns. Electrical contact is made as described before.

4 Claims, 8 Drawing Figures

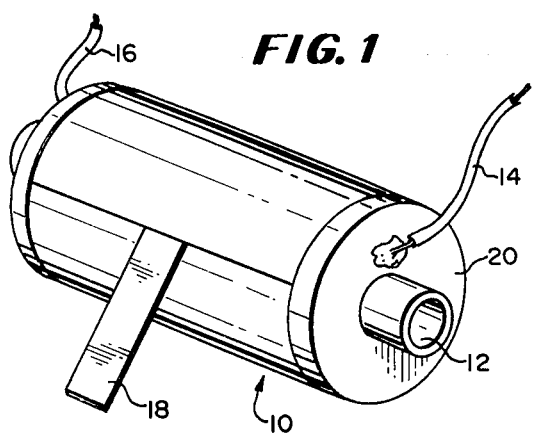
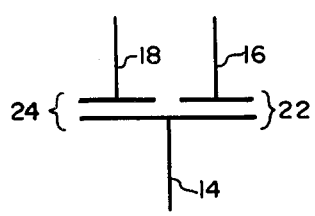
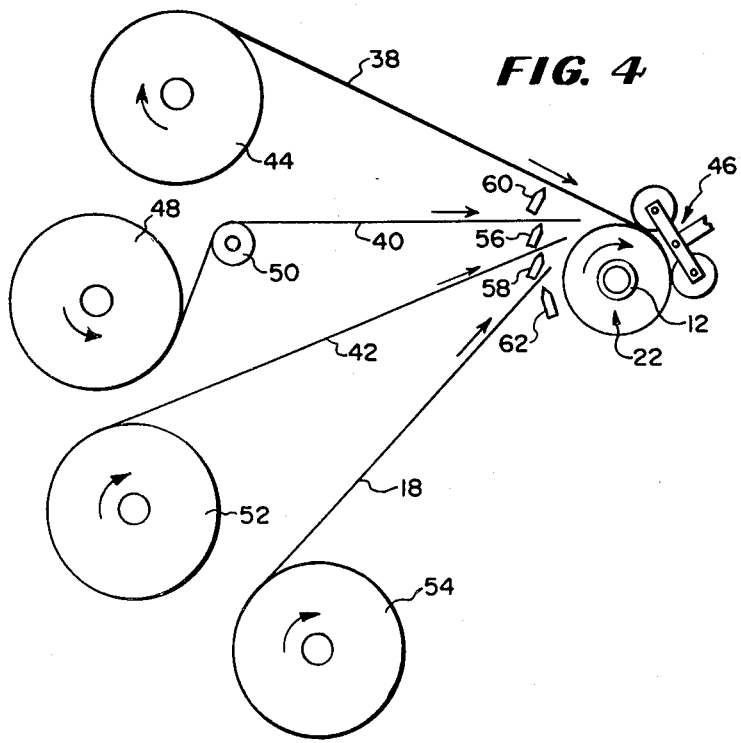
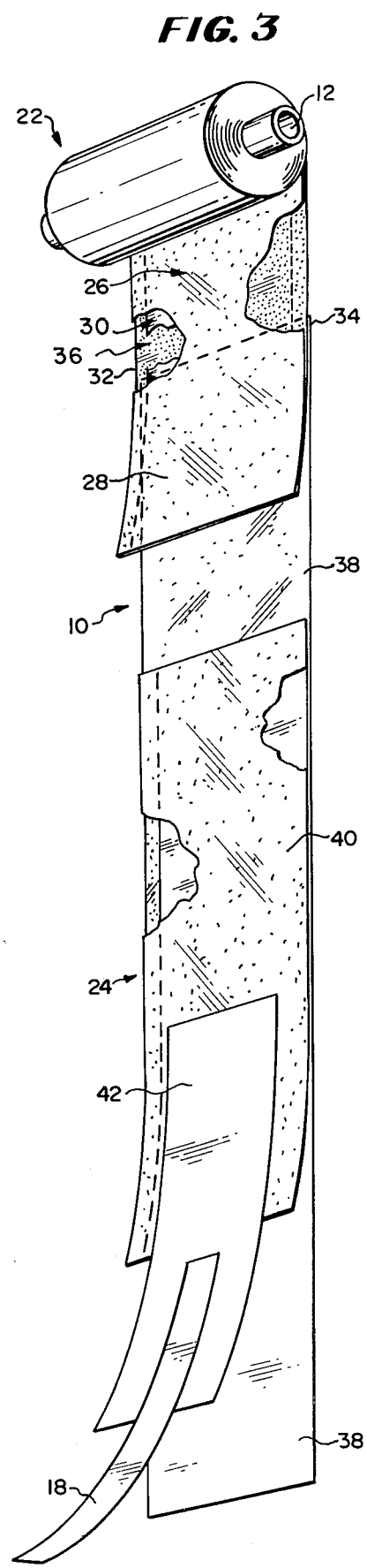

METHOD OF MAKING A DUAL VALUE CAPACITOR

BACKGROUND OF THE INVENTION

The invention relates to wound metallized film capacitors and more particularly to adding an additional auxiliary capacitor onto a first wound capacitor section to produce a dual value capacitor.

One method of making a dual value capacitor is disclosed in U.S. Pat. No. 3,921,041 issued to Stockman on Nov. 18, 1975. In this capacitor, one of the two basic metallized films has the metallized layer burned from its surface for a selected distance and an insulated sheet is inserted to encircle the capacitor at least once and to extend from one end of the roll. The winding is then completed around the insulated sheet and then both ends of the capacitor are shooped with one end providing the base plate and the other end, being divided into two sections by the extending insulated sheet, providing the other two sections of the dual value capacitor.

This method is not practical; however, when a small number of turns is desired to be added to the first section since there will be an insufficient end area on the auxiliary capacitor to attach a contact to. If a metal contact tab is added to the metallized film it will cause the film to burn away around the contact tab because of the small area involved. If the auxiliary section is end sprayed with metal, even if there is sufficient area to provide good electrical contact, the metallized film will burn away because of the small area involved.

Current technology generally makes use of a separate capacitor if an auxiliary capacitor having a small number of turns is required in conjunction with a large capacitor. One such application of a large capacitor with an auxiliary small capacitor is in the fluorescent lighting ballast which requires a large 3.95 microfarad capacitor and a small 0.05 microfarad capacitor for a typical rapid start design. It would be desirable to utilize a wound metallized film construction to take advantage of the self-healing or clearing properties of the metallized film. When a short occurs the metallized film will self-heal and clear itself so that a short is only temporary and does not destroy the whole capacitor as happens in conventional metal foil capacitors. The need has thus developed for a wound metallized film capacitor having first and second sections which may be easily constructed to provide a compact capacitor having both a core capacitor and an auxiliary capacitor having a small number of turns within the same unitary structure.

SUMMARY OF THE INVENTION

The above and other disadvantages of prior art dual value capacitors and capacitor winding techniques are overcome in accordance with the present invention by providing an auxiliary capacitor of a few turns which is easily wound and formed onto a first metallized wound section. The first section of two metallized films may be wound together into a cylindrical roll and the auxiliary capacitor may be added after both metallized films have been terminated of after cutting only one of the metallized films. If both metallized films have been terminated a plain film wrapper of about the same width as the base section is first wound around the base section and then a third metallized film is inserted between the roll and the plain film. If only one of the metallized films is cut, a plain film wrapper is inserted between the roll and the uncut metallized film. In either case, an aluminum or tinned copper foil is then inserted between the plain film wrapper and the insulated side of the metallized film and the auxiliary section is then wound onto the basic core for a sufficient length or number of turns to provide the proper capacitance. The termination of the auxiliary section may be made in several ways including leaving the metal foil exposed so that electrical contact may be made directly to it or preferably by cutting the single metallized foil, then cutting the metal foil, then cutting the plain wrapper after a tinned copper or other metal electrical contact has been inserted between the metal foil and the plain film. In this case, the electrical foil contact will be the last piece terminated so that it will provide the exposed electrical contact for the metal foil. The finished capacitor is then shooped on both sides to produce a base contact for both capacitor sections on one side of the roll connecting all the metallized film windings. The other contact for the first section will be produced on the other side of the roll with the electrical contact foil providing the auxiliary second capacitor connection.

BRIEF DESCRIPTION OF THE DRAWINGS

FIG. 1 is a perspective view of the completed unitary dual value capacitor of the invention;

FIG. 2 is an electrical schematic of the capacitor of FIG. 1;

FIG. 3 is an exploded perspective view of the formation of the capacitor;

FIG. 4 is a schematic view of the winding of the auxiliary section; and

DESCRIPTION OF THE PREFERRED EMBODIMENTS

Figure 5:
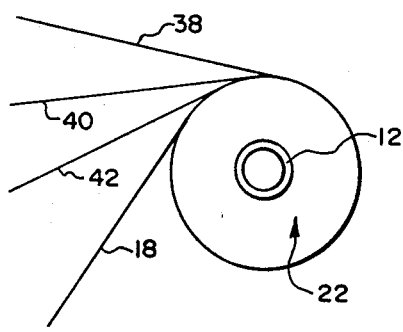
FIGS. 5 through 8 are a schematic progressive sequence of the winding of the auxiliary capacitor.

Referring now to FIG. 1, the completed dual value capacitor of the invention is designated generally at 10. The capacitor 10 is wound around a dielectric core 12 which may be mounted on a rotating spindle of a capacitor winding machine. The completed capacitor 10 has three electrical conductors 14, 16 and 18 attached to the three portions of the dual value capacitor (as shown schematically in FIG. 2).

The conductor 14 is attached to one end 20 of the completed capacitor which has been shooped (metal sprayed) to provide a contact to the base or common plate of the dual value capacitor as will be further described hereinafter. The second conductor 16 is connected to a second end of the capacitor 12 (not shown) which has also been shooped; however, the electrical contact thereof will only be made with the other plate of the first section to form a first base capacitor 22 between conductors 14 and 16. A second or auxiliary capacitor 24 is formed between the conductors 14 and 18. The conductor 18 is connected to the auxiliary capacitor by one of several methods, as will be described hereinafter.

The formation of the capacitor 10 will now be described with emphasis on the formation of the improved auxiliary capacitor 24 which is shown with its composite parts exploded in FIG. 3. FIG. 3 is, of course, not a real time operation, but is only an explanatory composite of how the various pieces of the basic capacitor 22 and the auxiliary capacitor 24 are assembled in one preferred operation. The basic or core capacitor 22 is formed from a first conventional metallized film 26 which includes a dielectric film base layer 28 which extends substantially the width of the finished capacitor 10, with a metallized coating 30 on one side of the layer 28. The coating 30 is aligned such that it is substantially tangent with a first edge 34 of the capacitor 10 and is offset inwardly from a second edge 32 of the capacitor 10.

A second conventional metallized film 36 is wound with the first film 26 and is constructed in an identical manner with the first metallized film 26, with the exception that the metallized coating of the second metallized film 36 is substantially even with the second edge 32 of the capacitor 10 and is offset inwardly from the first edge 34.

The auxiliary capacitor 24 may be formed in either of two main ways. It may be desired to terminate both metallized films 26 and 36, with a short difference in length to ensure that they do not short so that the basic capacitor 22 may then be sealed, or wrapped, or heat treated or be made in a different location, etc. The completed basic capacitor 22 often will be heat sealed to form a completed unit and then heat treated or heat set in a conventional manner to precondition the capacitor 22 for its operating environment. A wrapper also may be added at the end before the capacitor 22 is heat sealed or one of the two metallized films may be cut substantially before the other film and several turns of the remaining film may be added and then it may be heat sealed to itself to avoid shorting the two films together. If the basic capacitor 22 is first completed a plain film wrapper or dielectric 38 of substantially the same width as the metallized films 26 and 36 is first wound at least one turn around the capacitor 22 to provide the insulation for the second or auxiliary capacitor 24. The capacitor 24 is then formed from a third metallized film 40 which is of an identical construction with the first two metallized films 26 and 36. Again, one edge of the metallized coating of the film 40 will extend to one or the other of the edges 32 or 34 with the second edge of the metallized coating of the film 40 terminating short of and inset from the other edge.

Once a sufficient length of the third metallized film 40 has been inserted into the winding, between the plain film 38 and the now insulated core 22 so that the film 40 is secured to the roll, a metal foil 42 is inserted into the roll on the dielectric side of the metallized film 40. The metal foil 42 is chosen to be of the proper length to provide the capacitance desired between the metal foil 42 and the metallized film common plate connected to the conductor 14. The metal foil 42 has a width substantially less than the width of the foil 38 and the metallized foils 26, 36 and 40 so that it may be aligned such that it will not be contacted when both sides of the completed capacitor 10 are shooped. The metal foil 42 may be formed from aluminum foil or a tinned copper foil. Electrical contact may be provided by the conductor 18 which may be a tinned copper strip which is inserted between the metal foil 42 and the plain film wrapper 38 prior to the termination of the metal foil 42.

The metal foil 42 may also be terminated last and the connection made to the thin foil 42 by mechanically staking or crimping the conductor 18 to the exposed end of the metal foil 42. The electrical contact 18 for the auxiliary capacitor 24 may thus easily be made to the metal foil 42 which provides both a good mechanical and electrical connection. In addition, the metal foil 42 being adjacent the metallized film 40 will self-heal or clear in the same manner as would two metallized films.

Thus, the advantages of metal foil for the mechanical and electrical connection of the capacitor are obtained without losing the self-healing advantage of metallized film capacitors.

The sequential winding operation to form the auxiliary capacitor 24 will now be described with reference to FIGS. 4 through 8. The core 12 is mounted on the rotating spindle of a winding machine such as disclosed in a copending application entitled "CAPACITOR WINDING APPARATUS AND METHOD", Ser. No. 731,377 filed Oct. 12, 1976 and the continuation-in-part thereof, Ser. No. 833,015 filed Sept. 14, 1977, which are incorporated by reference. The plain dielectric film wrapper 38 is provided on a supply roll 44 and is inserted into a nip between the outer surface of the basic capacitor 22 and a starting chute or roller 46 which is provided to insure the initial adherence of the wrapper 38 to the outside of the roll 22. The wrapper 38 may also be taped or otherwise secured to the outside of the roll 22 to provide the initial adherence to the roll 22.

The core 12 and the supply roll 44 are then rotated so that the wrapper 38 is wrapped around the roll 22 at least one full revolution. The third metallized film 40 is mounted on a supply roll 48; however, the metallized film is conventionally supplied with the metallized surface inward and could be applied from that position with an adjustment of the other rolls and components; however, it is most convenient to supply the metallized film 40 from the supply roll 48 over an idler roller 50 such that the metallized surface is in contact with the bottom of the plain wrapper 38. The metallized film 40 is inserted into the nip between the plain wrapper 38 and the roll 22. The core 12 is then rotated a short distance to secure the third metallized film 40 between the roll 22 and the film wrapper 38.

The metal foil 42 is then inserted into the nip between the outside of the roll 22 formed by the wrapper 38 and the dielectric side of the metallized film 40 from a supply roll 52. The core 12 is then rotated a sufficient distance or number of turns to apply the proper length of the metal foil 42 to the auxiliary capacitor 24 for the desired capacitance thereof.

If the conductor or contact 18 is going to be connected to the metal foil 42 in the preferred manner, then just before the finished length of metal foil 42 is cut off, the contact 18 will be inserted into the nip between the roll 22 and the metal foil 42 from a supply roll 54. This will result in the configuration with each of the four materials being connected concurrently to the roll 22 as shown in FIG. 5.

Figure 6:
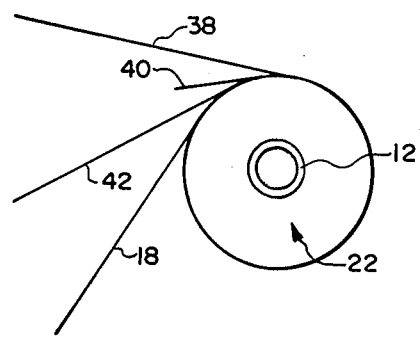
Figure 7:
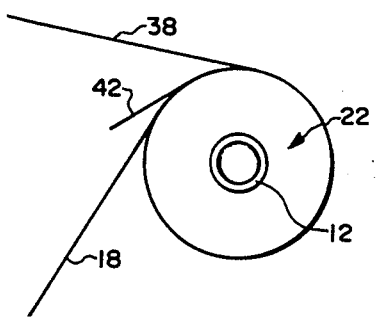
Figure 8:
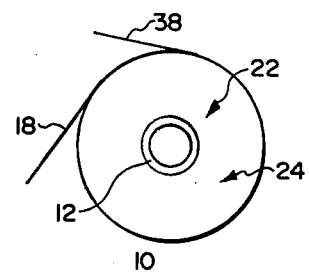

In the preferred embodiment the sequence of terminations of the various films are as follows, as best illustrated in FIGS. 6 through 8.

As is shown in FIG. 6, the third metallized film 40 is first cut with a knife 56 (FIG. 4). This cut may be made approximately at the same time as the contact 18 is inserted. Next as seen in FIG. 7, after approximately one more turn the metal foil 42 is cut by a knife 58. Then the plain film wrapper 38 is cut by a knife 60 shortly beyond the end of the foil 42, followed by the connector 18 by a knife 62 beyond the wrapper 38. For convenience four knives are illustrated, but there may be a single knife movable to the proper positions or several knives as described in the aforementioned copending application.

The sequence of terminating the various foils may be altered as for instance when the conductor 18 is to be added following the winding process, then the metal foil 42 will be cut last following the plain foil 38 so that the conductor 18 may be staked or otherwise connected to the exposed metal foil 42.

In an alternate embodiment, if the base capacitor 22 will not be heat treated or otherwise operated upon then the auxiliary capacitor 24 may be added without cutting both of the metallized films 26 and 36. This operation may be utilized where the finished capacitor 10 also will not be heat treated since the metallized film 26 and 36 will shrink; however, the metal foil 42 will not shrink which will cause the finished wound capacitor to become loose causing arcing between the various members of the capacitor 10. In this embodiment, utilizing a winding machine such as that in the copending application previously mentioned, one of the metallized films 26 or 36 will be cut; however, the second metallized film will be still attached to the basic capacitor 22.

The sequence is very similar to that previously described; however, it is most convenient to place the plain film wrapper 38 in the nip between the uncut metallized film 36 (for example) and the roll or base capacitor 22. Once the plain film wrapper has been wrapped around the roll 22 sufficiently to secure it, the metal foil 42 will be inserted between the plain film wrapper 38 and the bottom or dielectric side of the remaining metallized film 36. The sequence of operation following this point is the same as previously described.

In one specific embodiment the following dimensions may be utilized. The base film 26 is cut off and then approximately ten further turns of the film 36 are made and then the film 36 is heat sealed to itself. The base capacitor 24 thus formed is then heat treated or heat set. The plain film 38 is approximately 1/16 inches narrower than the width of the capacitor 24. The aluminum foil 42 is ½ to 1 mil thick and is ¼ inch narrower than the width of the capacitor 24 and centered around the capacitor 24 to provide electrical isolation when the capacitor 10 is shooped. The tinned copper foil conductor 18 is 3 mils thick and ⅜ inch wide and centered on the winding and extends approximately ¼ inch beyond the cut end of the plain film 38. The edges of the plain film 38 are heat sealed to prevent unwinding of the capacitor 10.

Many modifications and variations of the present invention are possible in light of the above teachings. The metal foil 42 also may be tinned copper or other good conductive metal foil. The conductor 18 might also be added to the foil 42 prior to winding. It is, therefore, to be understood that within the scope of the appended claims, the invention may be practiced otherwise than as specifically described.

I claim:
1. An improved method of making a dual value capacitor, including a core section formed by winding first and second metallized film strips one on top of the other into a cylindrical roll, each of said metallized film strips having a dielectric film layer having first and second outer edges and a first width and a metallized layer on one side of said dielectric film layer, said metallized layer having third and fourth outer edges and a second width less than said first width, said first outer edge of said dielectric film layer of said first metallized film strip being aligned with said third outer edge of said metallized layer of said first metallized film strip, said second outer edge of said dielectric film layer of said second metallized film strip being aligned with said fourth outer edge of said metallized layer of said second metallized film strip, the improved method comprising:
   terminating said first metallized film strip;
   winding a dielectric film strip having a width substantially equal to said first width around at least a portion of said roll;
   winding a strip of metal foil having a width less than said second width around at least a portion of said roll, aligned such that neither edge of said metal foil is exposed at either edge of said roll;
   terminating said second metallized film strip;
   rotating said roll at least a portion of a revolution and terminating one of said dielectric film strip and said metal foil; and
   rotating said roll at least a portion of a revolution and terminating the other one of said dielectric film strip and said metal foil.
2. The method as claimed in claim 1, further including:
   inserting an electrical contact foil having a width less than the width of said metal foil between said metal foil and said dielectric film strip prior to terminating one of said metal foil and said dielectric film strip;
   terminating said metal foil prior to terminating said dielectric film strip; and then
   terminating said electrical contact foil after said dielectric film strip is terminated leaving a portion of said electrical contact foil exposed.
3. The method as claimed in claim 1, further including:
   terminating both metallized film strips prior to winding said dielectric film strip onto said roll;
   winding said dielectric film strip at least once around said roll;
   inserting a third metallized film strip substantially identical to said first and second metallized film strips between said dielectric film strip and said roll with the metallized layer against the bottom of said dielectric film strip and winding said third metallized film strip around at least a portion of said roll; and
   inserting said metal foil between said dielectric film strip and said roll prior to winding said metal foil onto said roll.
4. The method as claimed in claim 3, further including:
   inserting an electrical contact foil having a width less than the width of said metal foil between said metal foil and said dielectric film strip prior to terminating one of said metal foil and said dielectric film strip;
   terminating said metal foil prior to terminating said dielectric film strip; and then
   terminating said electrical contact foil after terminating said dielectric film strip leaving at least a portion of said electrical contact foil exposed.

* * * * *